(12) United States Patent
Boday et al.

(10) Patent No.: US 10,668,502 B2
(45) Date of Patent: Jun. 2, 2020

(54) POLYMERIC COATINGS AND COATING METHOD

(71) Applicant: International Business Machines Corporation, Armonk, NY (US)

(72) Inventors: Dylan J. Boday, Tucson, AZ (US); Mareva B. Fevre, San Jose, CA (US); Jeannette M. Garcia, San Leandro, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/977,904

(22) Filed: May 11, 2018

(65) Prior Publication Data

US 2018/0257107 A1    Sep. 13, 2018

Related U.S. Application Data

(63) Continuation of application No. 14/991,625, filed on Jan. 8, 2016, now Pat. No. 9,999,905.

(51) Int. Cl.
*C09D 161/22* (2006.01)
*C08G 12/08* (2006.01)
(Continued)

(52) U.S. Cl.
CPC .............. *B05D 7/542* (2013.01); *B05D 1/02* (2013.01); *B05D 1/18* (2013.01); *B05D 1/36* (2013.01);
(Continued)

(58) Field of Classification Search
CPC ...................................................... C08G 12/08
See application file for complete search history.

(56) References Cited

U.S. PATENT DOCUMENTS

| 7,707,673 B2 | 5/2010 | Durbin |
| 2009/0039018 A1 | 2/2009 | Jordi et al. |

(Continued)

FOREIGN PATENT DOCUMENTS

| KR | 100193384 | 2/1999 |
| SU | 1719412 A1 | 3/1992 |

OTHER PUBLICATIONS

Garcia et al., "Recyclable, Strong Thermosets and Organogels via Paraformaldehyde Condensation with Diamenes," Science 344 (6185), 732-735, May 16, 2014. (Year: 2014).
(Continued)

*Primary Examiner* — Ramsey Zacharia
(74) *Attorney, Agent, or Firm* — Patterson + Sheridan, LLP

(57) ABSTRACT

Polymeric coatings and methods of forming polymeric coatings are described. In a method of forming a polymeric coating a first layer is deposited on a substrate. The first layer includes at least one highly soluble diamine component. A second layer is formed on the substrate to contact the first layer. The second layer includes paraformaldehyde and an aromatic diamine including two primary amine groups. Once formed, the first and second layers are heated. Heating causes the components of the first and second layers to cure. For example, the paraformaldehyde from the second layer diffuses into the first layer and reacts via hemiaminal-type chemistry with the high soluble diamine component. The coatings may be substantially homogenous or comprise a compositional gradient in thickness or along the substrate plane depending on deposition methods and other processing parameters.

18 Claims, 6 Drawing Sheets

(51) Int. Cl.
- *B05D 7/00* (2006.01)
- *B05D 1/18* (2006.01)
- *B05D 1/02* (2006.01)
- *C03C 17/34* (2006.01)
- *C01B 32/168* (2017.01)
- *B05D 1/36* (2006.01)
- *B05D 3/02* (2006.01)
- *B05D 1/38* (2006.01)
- *B29C 64/00* (2017.01)
- *C08G 12/04* (2006.01)
- *B33Y 70/00* (2020.01)
- *C03C 17/32* (2006.01)

(52) U.S. Cl.
CPC ............ *B05D 1/38* (2013.01); *B05D 3/0254* (2013.01); *B29C 64/00* (2017.08); *C01B 32/168* (2017.08); *C03C 17/3405* (2013.01); *C08G 12/043* (2013.01); *C08G 12/08* (2013.01); *C09D 161/22* (2013.01); *B05D 2201/00* (2013.01); *B05D 2202/00* (2013.01); *B05D 2203/30* (2013.01); *B05D 2203/35* (2013.01); *B05D 2256/00* (2013.01); *B33Y 70/00* (2014.12); *C03C 2218/111* (2013.01); *C03C 2218/112* (2013.01); *C03C 2218/32* (2013.01)

(56) References Cited

U.S. PATENT DOCUMENTS

| | | |
|---|---|---|
| 2009/0093608 A1 | 4/2009 | Rushkin et al. |
| 2013/0230693 A1 | 9/2013 | Mitadera |
| 2014/0135448 A1 | 5/2014 | Rome et al. |
| 2015/0064484 A1 | 3/2015 | Chung et al. |
| 2015/0090941 A1 | 4/2015 | Ogawa et al. |
| 2015/0104579 A1 | 4/2015 | Hedrick et al. |
| 2016/0046836 A1 | 2/2016 | Kikuchi et al. |
| 2016/0289387 A1* | 10/2016 | Wang ................ C08G 73/0644 |
| 2017/0198165 A1 | 7/2017 | Boday et al. |

OTHER PUBLICATIONS

IBM U.S. Appl. No. 14/991,625, filed Jan. 8, 2016.
List of IBM Patents or Patent Applications Treated as Related.

* cited by examiner

POLYMERIC COATINGS AND COATING METHOD

CROSS-REFERENCE TO RELATED APPLICATIONS

This application is a continuation of co-pending U.S. patent application Ser. No. 14/991,625, filed Jan. 8, 2016. The aforementioned related patent application is herein incorporated by reference in its entirety.

BACKGROUND

The present disclosure relates to polymeric materials, and more specifically, to polymeric materials for coatings and composite materials and processes for forming coatings and composite materials.

SUMMARY

According to one embodiment of the present disclosure, a method includes depositing a first layer on a substrate. The first layer comprises at least one compound selected from the following:

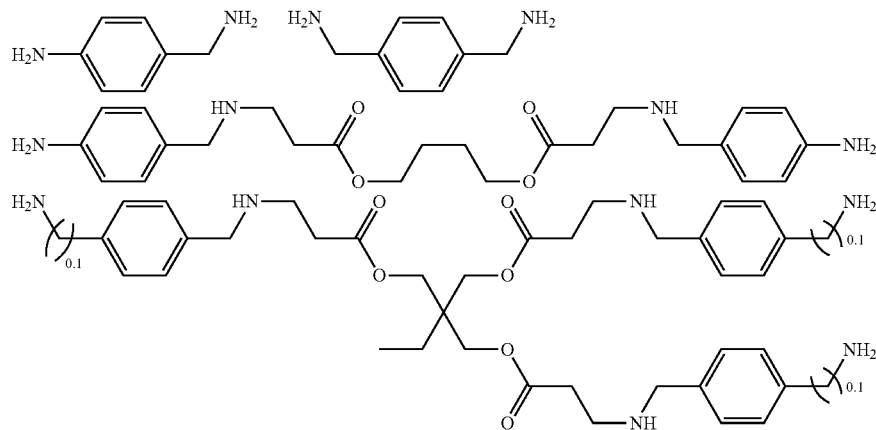

A second layer is deposited on the substrate, the first and second layers contact each other. The second layer comprises paraformaldehyde and an aromatic diamine including two primary amine groups. Once deposited on the substrate, the first and second layers are heated. The order of deposition for the first and second layers is not particularly limited and the second layer may be deposited on the substrate before the first layer. Additionally, in some embodiments, either of the first and second layers may cover only a portion of the substrate.

According to another embodiment, a coating method includes forming a primer film on a substrate. The primer film is formed from a primer solution including at least one compound selected from the following:

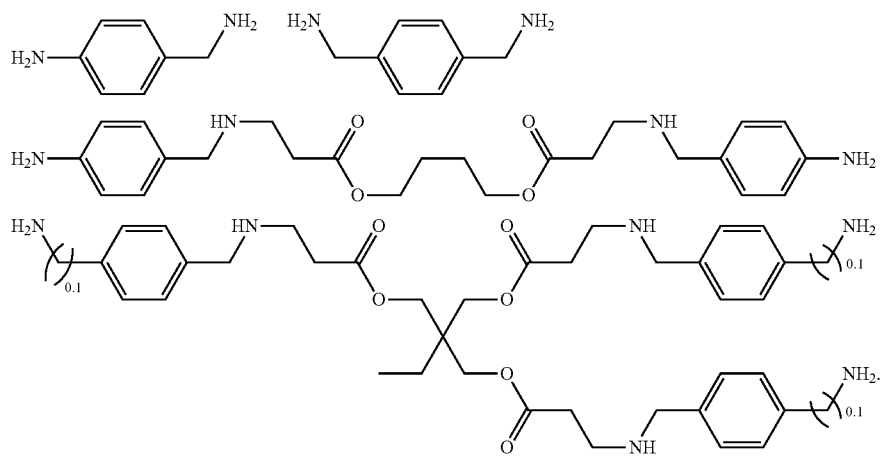

In this embodiment, a precursor film is formed over the primer film. The precursor film formed from a precursor solution including paraformaldehyde and an aromatic diamine including two primary amine groups. After the primer film and the precursor film are formed, the primer film and the precursor film are heated to a temperature between 50° C. and 200° C.

According to yet another embodiment, a polymeric coating is formed by a method comprising depositing a first layer on a substrate. The first layer includes at least one compound selected from the following:

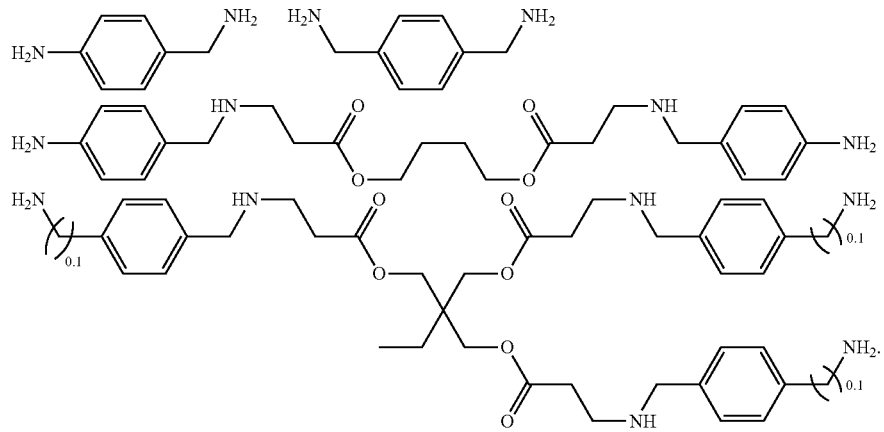

The method further comprises depositing a second layer on the substrate. The first and second layers contact each other. The second layer comprises paraformaldehyde and a first aromatic diamine including two primary amine groups. After deposition, the first and second layers are heated.

DETAILED DESCRIPTION

Figure 1:
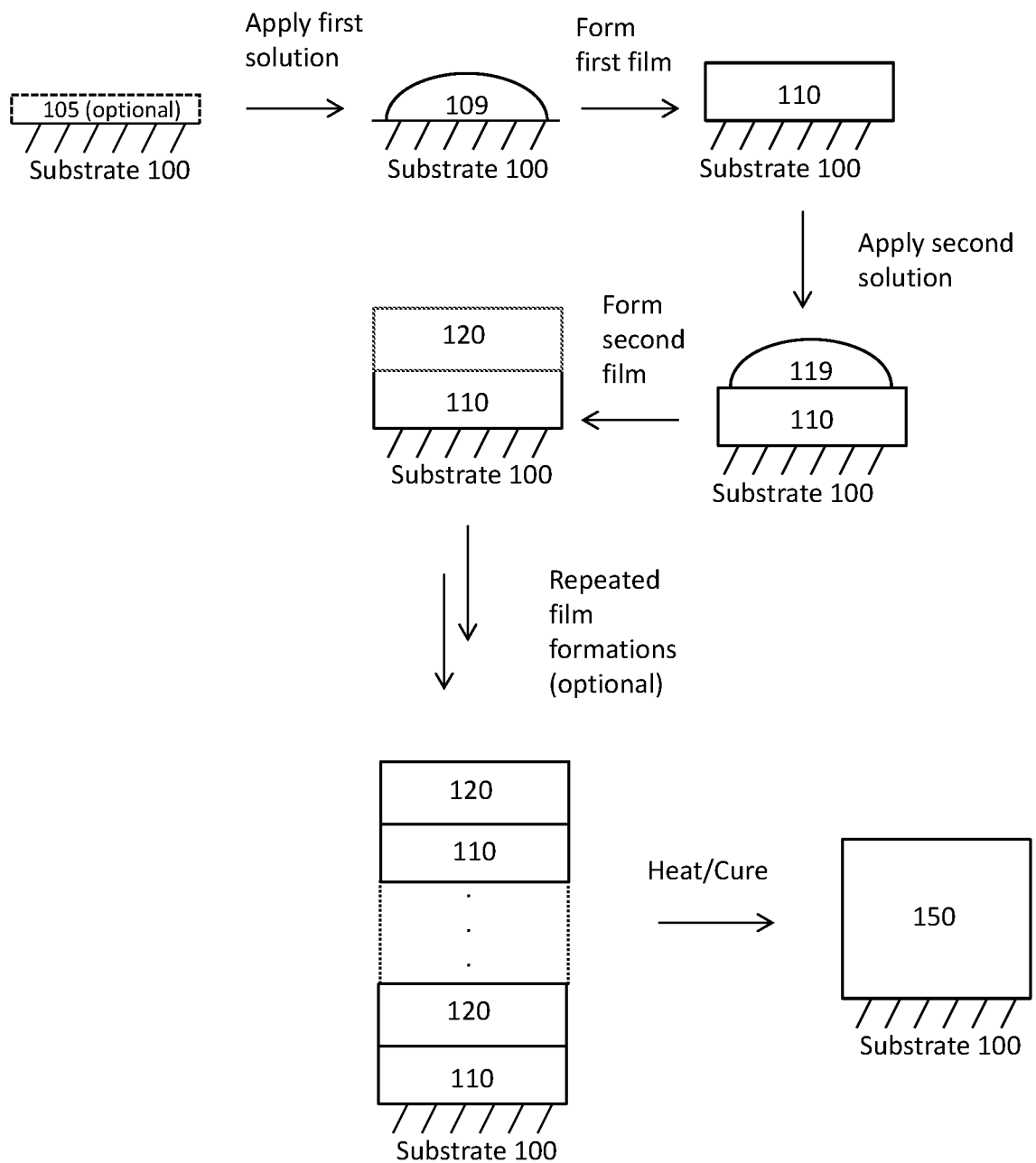
FIG. 1 depicts a process for forming a polymeric coating on a substrate.

With reference now to FIG. 1, a polymeric coating 150 is formed on a substrate 100. Substrate 100, for graphical convenience, is depicted as a single, flat surface. However, substrate 100 is not particularly limited in shape, morphology, or composition. In some specific example embodiments, substrate 100 can be an optically flat glass substrate, a carbon fiber, a carbon fabric, a metal sheet, a printed circuit board, a silicon wafer, or a porous material. The substrate may be a reinforcing portion for a composite material. In most, but not necessarily all embodiments, it will be preferable for the polymeric coating 150 to adhere strongly to substrate 100. Adhesion between coating 150 and substrate 100 may be aided by inclusion of an adhesion promoting layer 105, but adhesion promoting layer 105 is optional and may be included or excluded depending on intended end use and/or the specific materials selected for substrate 100 and polymeric coating 150.

In FIG. 1, a process of forming a polymeric coating 150 on substrate 100 (with the optional adhesion promoting layer 105 disposed thereon) begins by forming a primer film 110 on substrate 100. Primer film 110 is formed from a primer solution 109 including one or more highly soluble diamine component (also referred to as a "HSDA component" or "HSDA"). The composition of the primer solution 109 and the highly soluble diamine component(s) within primer solution 109 are discussed further below. In an example, 4-amino benzylamine may be the HSDA component in primer solution 109. The primer solution 109 may include an organic solvent.

In FIG. 1, adhesion promoting layer 105 is not depicted on the substrate after its initial formation, but the adhesion promoting layer 105 may be present during later processing steps and/or in the final product if initially present.

The primer film 110 can be formed on substrate 100 by physical application of the primer solution 109 to the substrate 100 in a process such as dip coating, spin coating, brush coating, roll coating, blade coating, knife coating, spray coating, and/or intaglio-type printing. The primer film 110 can be formed to cover all or only a portion of the surface of substrate 100. Similarly, thickness (in a direction orthogonal to surface of substrate 100) of the primer film 110 can be constant or varying over the substrate 100.

After primer film 110 is formed, a precursor film 120 is formed over the primer film 110. The precursor film 120 can be formed by physical application of a polymeric precursor solution 119 (also referred to as "precursor solution 119") in a process such as dip coating, spin coating, brush coating, roll coating, blade coating, knife coating, spray coating, and/or intaglio-type printing. The precursor film 120 can be formed to cover all or only a portion of the primer film 110. Thickness (in a direction orthogonal to surface of substrate 100) of the precursor film 120 can be constant or varying. The composition of the polymeric precursor solution 119 is discussed further below, but, in general, the polymeric precursor solution 119 includes paraformaldehyde (PF) and an aromatic diamine component (also referred to as an "ADA component" or "ADA"). In this context, paraformaldehyde is a polyacetal $OH(CH_2O)_mH$ (wherein m is typically in a range of 8-100). In a specific example, 4,4'-oxydianiline (ODA) can be used as the aromatic diamine component. The precursor solution 119 may also include an organic solvent.

After the precursor film 120 is formed, a second primer film 110 can optionally be formed over the precursor film 120. That is, a three or more layer coating (i.e., primer film 110/precursor film 120/primer film 110) can be formed on the substrate 100. The process used for forming the second primer film 110 over the precursor film 120 can be the same type of process used to form the initial primer film 110 or a different type process can be used. For example, dip coating can be used to form the initial primer film 110 on the substrate 100 and spray coating can be used to form the second primer film 110 over the precursor film 120. Similarly, the primer solution 109 used for forming the primer films 110 can be varied for each layer, though in each instance the primer solution 109 contains one or more highly soluble diamine component.

The thickness of each primer film 110 can be the same or each film may have a different thickness. The coverage ratio for each primer film 110 formed on the substrate 10 can be the same or different. That is, for example, the initial primer film 110 may cover the entirety of the surface of substrate 100 and the second primer film 110 may cover only a portion of the precursor film 120. The second primer film 110 may be formed on the underlying precursor film 120 in an arbitrary pattern, such as might be supplied in conjunction with a 3D printing process or the like.

After the second primer film 110 is formed, another precursor film 120 can optionally be formed. The process used to form the second precursor film 120 can be same type of process used to form the initial precursor film 120 or may be a different type process. For example, blade coating can be used to form the initial precursor film 120 and intaglio-type printing can be used to form the second precursor film 120 (that is, the fourth layer in a four layer coating). The composition of the precursor solution 119 can be varied for each precursor film 120, though in each instance paraformaldehyde and an aromatic diamine component are present.

As depicted in FIG. 1, a plurality of primer films 110 and precursor films 120 can optionally be formed on substrate 100. The number of each of the films in the stack is not particularly limited though overall film quality of the coating 150 may be poor for very thick coatings and this may serve as a practical upper limit on the number of films in some instances. Furthermore, while each primer film 110 and precursor film 120 in FIG. 1 is depicted as having substantially the same thickness, this is not required. For example, each primer film 110 may be approximately 100 nm thick when formed and each precursor film 120 may be 200 nm thick when formed. As discussed above, each primer film 110 can also have a thickness that is independently set from the other primer films 110. Similarly, each precursor film 120 can also have a thickness that is independently set from the other precursor films 120. Furthermore, while depicted in FIG. 1 as being deposited in a one-to-one ratio in a fully alternating manner, a primer film 110 may be formed directly on another primer film 110 and a precursor film 120 may be formed directly on another precursor film 120. This stacking of the same film-types directly upon one another may be used, for example, as a means to provide different layer thicknesses in the coating film stack without varying the composition of solutions or the processes used in forming the individual films.

In some embodiments, a precursor film 120 may be the initial film formed on the substrate 100 rather than a primer film 110. Likewise, the capping layer (the last film in the coating stack) can be a primer film 110 rather than a precursor film 120. That is, order of formation of primer film(s) 110 and precursor film(s) 120 can be varied without limitation.

After a film stack including at least one primer film 110 and at least one precursor film 120 is formed on the substrate 100, the film stack is cured, by heating or other processes of extending chemical bonding in a polymer system, to form the coating 150. The curing process will be discussed further below, but, in general, it includes formation of a crosslinked resin material through hemiaminal-type chemistry. Depending on relative amounts and disposition of components in the primer films 110 and the precursor films 120, the resultant coating 150 can be a substantially homogenous polymeric coating, a polymeric coating with a compositional gradient along the thickness direction, or a polymeric coating having a 3D-type physical and/or compositional patterning along the substrate 100 plane and/or in the thickness direction above the substrate 100 plane.

As noted, substrate 100 is depicted in FIG. 1 as a single, flat surface, but substrate 100 is not particularly limited in shape, morphology, or composition. Substrate 100, for example, may be formed of insulating materials, conductive materials, semiconductor materials, silicon, metals, carbon fiber, wood, plastic, or various combinations of materials. Substrate 100 may itself be polymeric or include polymeric layers. Substrate 100 my comprise stacked or otherwise mixed layers of various materials, such as a crystalline silicon wafer having patterned and unpatterned layers of metal, insulators, and semiconductor material disposed thereon. In addition, substrate 100 may have surface topography including, for example, local peaks and valleys relative to an average substrate plane, mesas, trenches, lines, spaces, pillars, holes, or other features disposed on or in the substrate 100. Substrate 100 may also have an outer surface that is bent, spherical, concave, convex, or otherwise non-planar. Substrate 100 may be a fabric, a felt, a mesh, or a scaffold (reinforcement) material for a composite component. For example, substrate 100 may comprise carbon fibers and/or carbon nanotubes.

Adhesion Promoting Layer

As described above, an adhesion promoting layer 105 can be used to promote adhesion between the first film 110 (or a second film 120, if first in the coating stack) and the substrate 100. The adhesion promoting layer 105 may be a distinct film applied to substrate 100 by, for example, a vapor deposition process such as physical vapor deposition, chemical vapor deposition, atomic layer deposition, or the like, or a physical application process such as one of those suggested for forming the first film 110. The adhesion promoting layer 105 can also be formed by conversion or modification of a portion of substrate 100. In some embodiments, the adhesion promoting layer 105 may be the residue or result of a surface treatment process such as a plasma treatment process or cleaning process which causes the surface of the substrate 100 to be modified in some manner. For example, partial oxidation of substrate 100 to form an oxide film on the surface of substrate 100.

Primer Solution

The primer solution 109 used in forming primer film 110 may include one or more materials which may be described as a highly soluble diamine component. The highly soluble diamine component includes two primary amine groups per molecule and is readily soluble in an organic solvent. The HSDA component is characterized by its relatively quick reaction with paraformaldehyde to form a polymeric material. The speed of the reaction of the HSDA and paraformaldehyde may be such that it would be difficult to handle or otherwise process a mixture of HSDA and paraformaldehyde before substantial polymerization (gelation) occurs. The reaction rate of HSDA and paraformaldehyde may be substantial even at room temperature (25° C.). As such, while the primer solution 109 can include a solvent, it typically does not include paraformaldehyde because gelation of the mixture would severely limit storage lifetime of the primer solution 109 and/or cause difficulty in the processing used to form the primer film 110. Non-limiting examples of HSDA components are provided below:

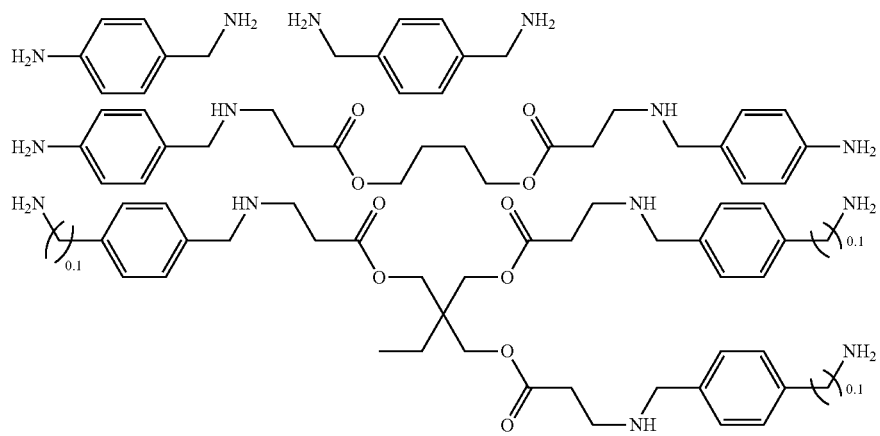

Possible HSDA components include 4-aminobenzylamine and p-xylylenediamine and the condensation products of 4-aminobenzylamine with 1,4-butanediol diacrylate or trimethylolpropane triacrylate. As used above, the structural notation ($-CH_2-$)$_{0,1}$ indicates the methylene group may be present (1) or absent (0) at the specific location depicted. Thus, the amino end group may be directly bonded to the aromatic ring. In this context, each end group can be independent of the other end groups in the molecule.

The highly soluble diamine component(s) may be present at a concentration between 1 and 100 wt %. As noted, the primer solution 109 may include a solvent. The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). Most preferably, the solvent is NMP.

The viscosity of the primer solution can be varied by changing the concentration and/or the selection of particular HSDA components. For instance, 4-amino benzylamine and p-xylylenediamine are liquid at room temperature, but the condensation products of 4-amino benzylamine with 1,4-butanediol diacrylate or trimethylolpropane triacrylate are viscous oils. However, each of these materials quickly solubilize in NMP (or other organic solvents). A higher viscosity for the primer solution 109 may be useful for certain coating processes such as dip coating, spin coating, or other physical application techniques such as brush coating, roll coating, or intaglio-type printing because higher viscosity materials will be more likely to maintain substrate coverage after being applied. A lower viscosity for the primer solution 109 may be useful for certain coating processes such as spray-on coating, inkjet printing, or other processes requiring the primer solution 109 to pass through narrow openings, channels, or pores. In general, primer solution 109 viscosity may be lowered by increasing relative solvent content and/or selecting lower viscosity components over higher viscosity components. In general, primer solution 109 viscosity may be increased by decreasing relative solvent amounts and/or increasing amounts of higher viscosity components.

Precursor Solution

The precursor solution 119 includes paraformaldehyde (PF), at least one monomer having two primary aromatic amine groups, and optionally a solvent. The precursor solution 119 may include a single aromatic diamine (ADA) component or a mixture of two or more ADA component types. The precursor solution 119 may optionally include a diluent-type monomer component having only one primary aromatic amine group. The inclusion of diluent-type components can be used to control crosslink density of cured resins materials. The ratio of paraformaldehyde to primary aromatic amine groups will generally be greater than one and may be set with consideration of the expected relative amount of primary amine groups in the HSDA of the primer solution 109 (or more specifically, the amount of HSDA in primer film(s) 110 formed from the primer solution 109).

A non-limiting group of exemplary monomers including two primary aromatic amine groups which can be used as ADA components can be described by the formula (1):

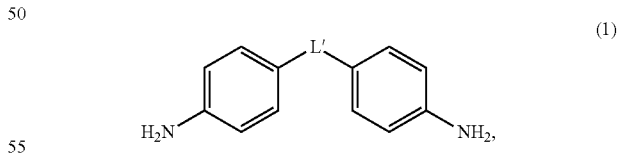

wherein L' is a divalent linking group. The L' divalent linking group can be selected from the group consisting of *—O—*, *—S—*, *—N(R')—*, *—N(H)—*, *—R"—*, and combinations thereof, wherein R' and R" independently comprise at least 1 carbon, and here each "*" starred bond indicates a point of attachment to an aromatic ring. In an embodiment, R' and R" are independently selected from the group consisting of methyl, ethyl, propyl, isopropyl, phenyl, and combinations thereof. Other possible L' divalent linking groups include methylene (*—CH2-*), isopropylidenyl (*—C(Me)$_2$-*), and fluorenylidenyl:

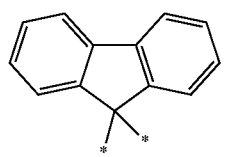

Non-limiting exemplary aromatic diamine (ADA) components include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), benzidine, 4,4'-thiodianiline (TDA), and N1-(4-aminophenyl)-N1-phenylbenzene-1,4-diamine (APDA) which have the following structures:

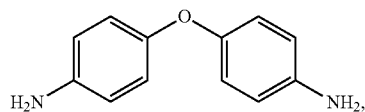
(ODA)

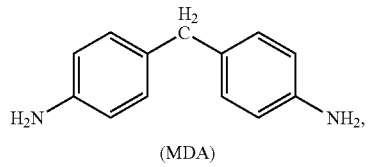
(MDA)

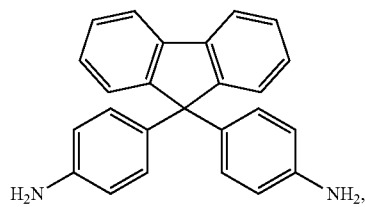
(FDA)

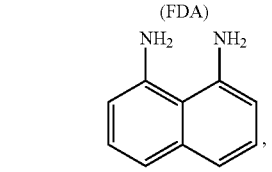
(15DAN)

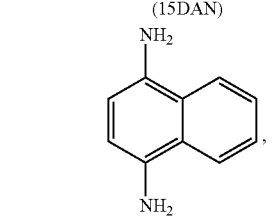
(14DAN)

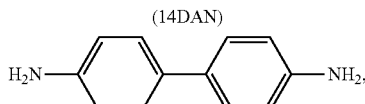
(benzidine)

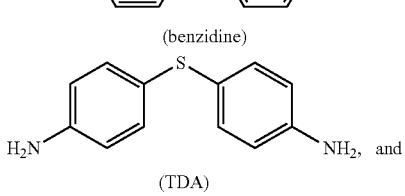
(TDA)

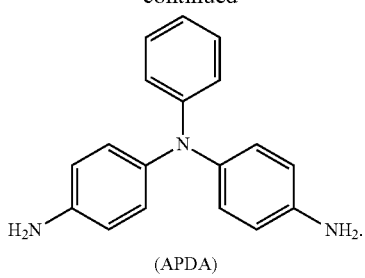
(APDA)

The precursor solution 119 at time of application to substrate 100 may include oligomers resulting from polymerization of the ADA monomer(s) initially present in precursor solution 119. The precursor solution 119 may be specifically processed to cause partial polymerization of solution components before application to substrate 100 or partial polymerization may be an unintended or unavoidable consequence of storage and/or handling prior to application. Partial polymerization of precursor solution 119 prior to application may improve film forming qualities in some instances by increasing solution viscosity. Low temperature storage for precursor solution 119 prior to application may be used to limit pre-application polymerization and improve solution shelf life.

As noted, precursor solution 119 may include one or more diluent-type monomer. A diluent monomer includes only a single primary aromatic amine group rather than two. As such, the diluent-type monomer can be included to control the degree/extent of crosslinking in the final coating 150. While discussed here in the context of inclusion in the precursor solution 119, a diluent-type monomer may also, or instead, be included in primer solution 109.

Non-limiting, exemplary diluent-type monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

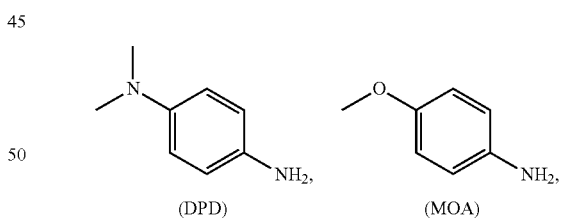
(DPD)   (MOA)

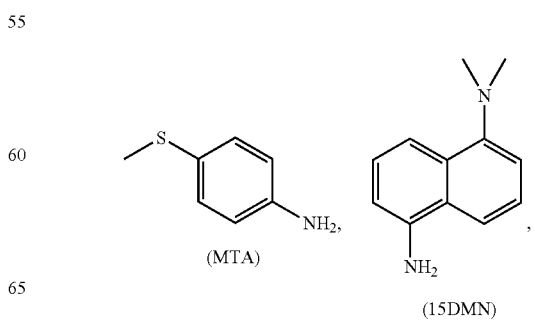
(MTA)   (15DMN)

-continued

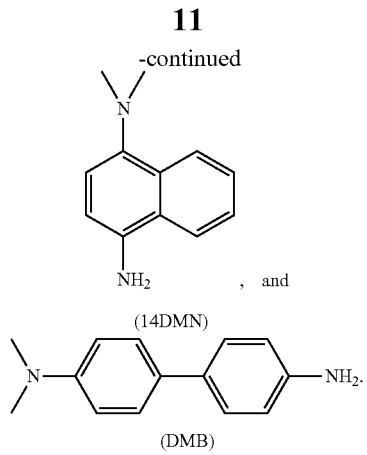

(14DMN) , and (DMB)

As noted, the precursor solution 119 may include a solvent. The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). Most preferably, the solvent is NMP.

Coating Process

Figure 2:
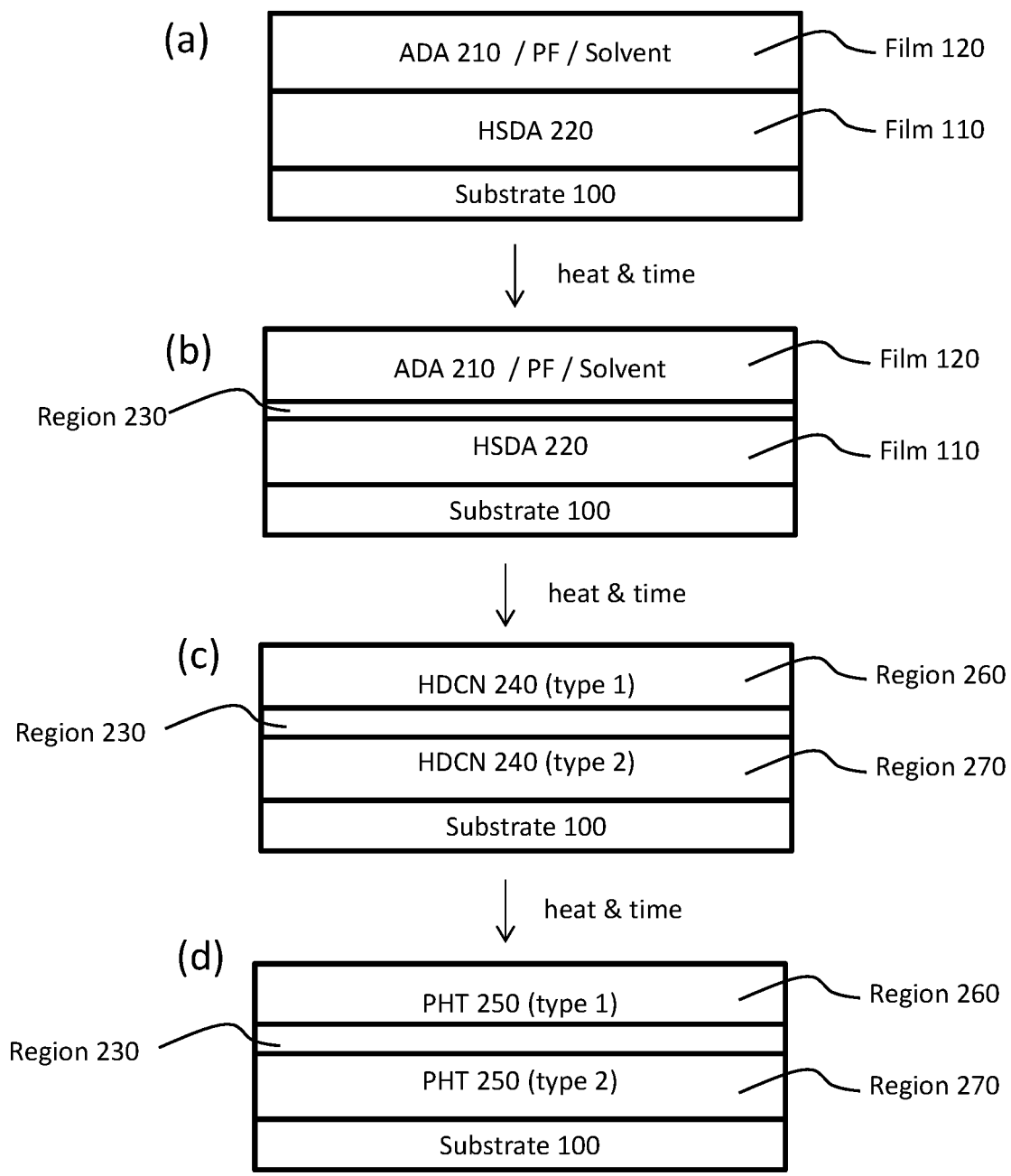
FIG. 2 depicts formation of a polymeric coating on a substrate.

FIG. 2 depicts formation of a polymeric coating on a substrate. For simplicity, only one primer film 110 and one precursor film 120 is depicted as being disposed on substrate 100. Primer film 110 includes a highly soluble diamine (HSDA) 220, which is highly soluble diamine component as described above. Precursor film 120 includes an aromatic diamine (ADA) 210, which is an aromatic diamine component as described above, paraformaldehyde, and solvent. In state (a) depicted in FIG. 2, the films are discrete and film components have not substantially diffused or otherwise mixed. In some embodiments, state (a) will be short-lived because mixing of layers may occur nearly instantaneously upon application of the second film (e.g., film 120) on the first film (e.g., film 110). That is, depending on such factors as the application methods, solvent loadings, and the miscibility of different components, substantial mixing of layers may occur during application of the second film (e.g., film 120) in the stack.

State (b) in FIG. 2 depicts a region 230 between film 110 and film 120 that is an interfacially mixed region in which components from the adjacent films are found. For example, region 230 may include paraformaldehyde, solvent, ADA 210, and HSDA 220. The size of region 230 may depend in part on the length of time the films 110 and 120 have been in contact and/or the coating method used to form the films. Components in the adjacent films will tend to diffuse from areas of high concentration to low concentration. In general, lower molecular weight components will be expected to migrate more quickly than higher molecular weight components. Heat also promotes diffusion of components, but in this instance heat also promotes polymerization reactions amongst the available components. The incorporation of various components into polymer chains (increasing molecular weight) will tend to hinder diffusion between the films. As such, the degree of mixing (size of region 230) may be alterable by varying processing temperature, with high temperatures (e.g., ~200° C.) possibly limiting the extent of mixing between layers depending on relative rates of polymerization (vitrification) and component diffusion.

State (b) of FIG. 2 depicts films 110 and 120 before substantial curing of film components has occurred. In state (c) of FIG. 2, an initial curing reaction has occurred. Film 120 has been converted to region 260 containing a hemiaminal dynamic covalent network (HDCN) 240. Here, available primary aromatic amine groups begin to react with paraformaldehyde. Polymers result from this reaction when at least one of the reactants has a second primary aromatic amine that is available for reaction. In a similar manner to film 120, film 110 converts to region 270 containing a HDCN 240. In general, the conversion of film 110 into a region 270 containing HDCN 240 requires the transport/diffusion of paraformaldehyde from film 120 into film 110.

In state (c), region 230 also contains HDCN material. The material of region 230 in state (c) may include a HDCN 240 (type 1) formed solely by reaction of ADA 210 with paraformaldehyde, a HDCN 240 (type 2) formed solely by reaction HSDA 220 and paraformaldehyde, and a HDCN 240 (type 3) formed by a mixed reaction of ADA 210 and HSDA 220 with paraformaldehyde. All three types of HDCN 240 may be present in region 230.

Figure 3:
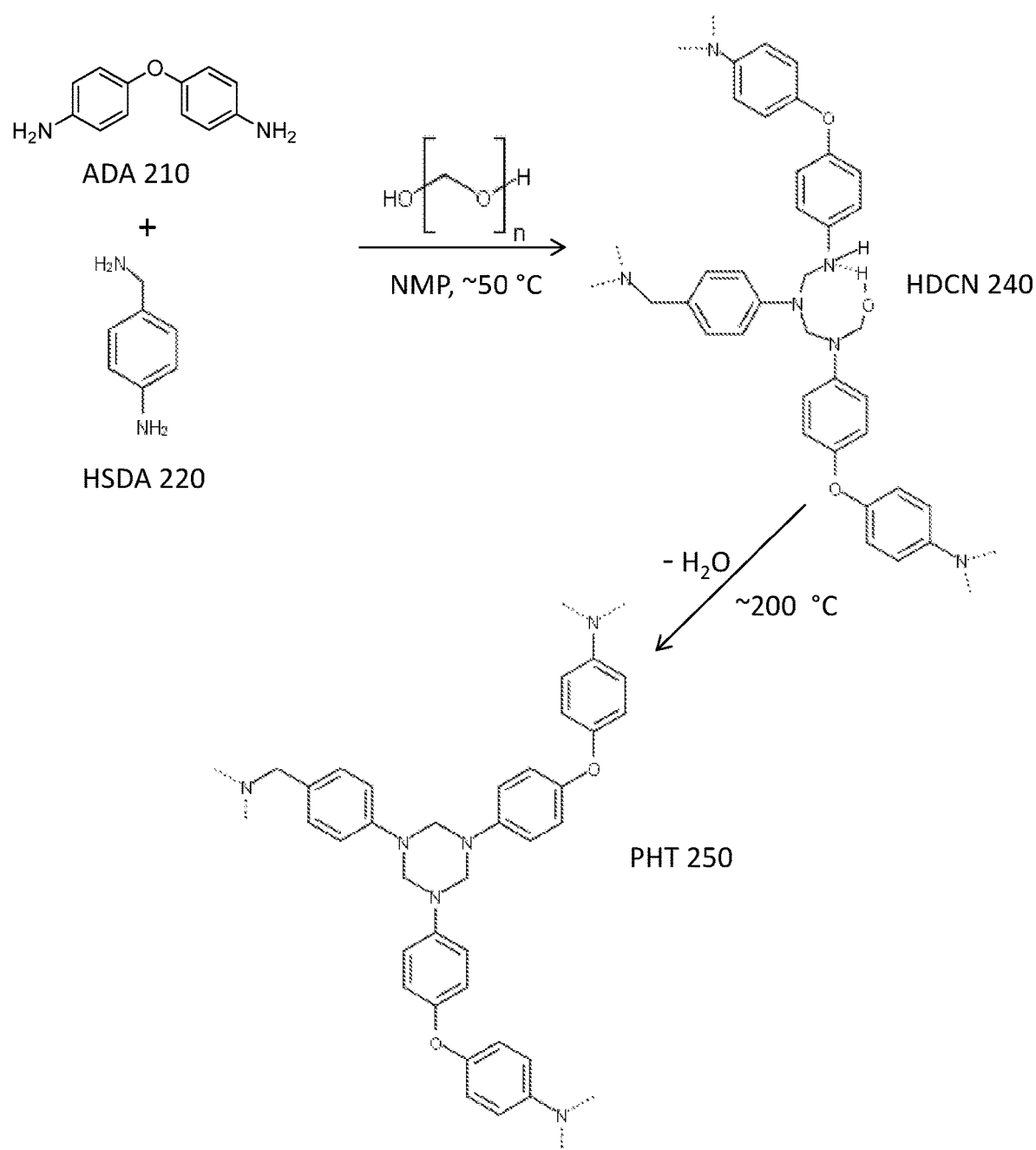
FIG. 3 depicts an exemplary reaction scheme for forming polymeric coating on a substrate.

FIG. 3 depicts an exemplary reaction scheme for forming polymeric coating on a substrate. FIG. 3 specifically depicts formation of HDCN 240 (type 3) incorporating both an aromatic diamine (ADA 210) from film 120 and a highly soluble diamine (HSDA 220) from film 110. In this instance, the ADA 210 is ODA and HSDA 220 is 4-amino benzylamine.

In state (d) of FIG. 2, HDCN 240 is converted polyhexahydrotriazine (PHT) 250. In state (d) region 230 may include a PHT 250 (type 1) having ADA 210 as a precursor, a PHT 250 (type 2) having HSDA 220 as a precursor, and a PHT 250 (type 3) having both ADA 210 and HSDA 220 as precursors. All three types of PHT 250 may be present in region 230. As noted, FIG. 3 depicts an exemplary reaction scheme for forming polymeric coating on a substrate. FIG. 3 specifically depicts formation of PHT 250 (type 3) incorporating both an aromatic diamine (ADA 210) from film 120 and a highly soluble diamine (HSDA 220) from film 110. Depending on processing temperature HDCN 240 may be only transiently, if at all, present.

Compositionally Homogenous and Gradient Coatings

Figure 4A:
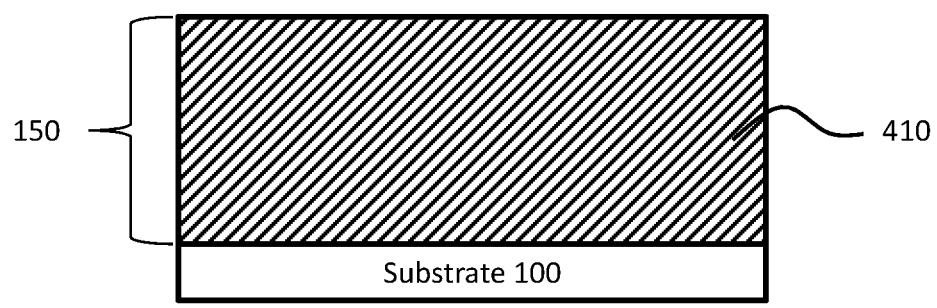
FIG. 4A depicts a homogenous a polymeric coating.

FIG. 4A depicts a homogenous polymeric coating formed on a substrate. In FIG. 4A, coating 150 formed on substrate 100 corresponds to a condition in which the materials of film 120 and film 110 (see state (a) in FIG. 2) become intimately mixed before or during the conversion of ADA 210 and HSDA 220. The resultant coating 150 is substantially homogenous. The mixing necessary for obtaining a homogenous coating 150 may occur during the initial deposition of film 120 on to film 110 and/or may be considered to result from an exaggerated version of state (b) in which region 230 subsumes all of film 110 and film 120 by eventual diffusion (or other mixing) of components. It should be noted that while a progression from state (a) to state (d) depicted in FIG. 2 occurs in sequence for purposes of explanation, formation of a homogenous coating 150 as depicted in FIG. 4A is not necessarily a continuation of the sequence depicted in FIG. 2, but rather a homogenous coating 150 is an end state variant resulting from selection of processing and compositional parameters to provide substantial mixing of the film 110 and film 120 components at some point during the coating process rather than only partial mixing.

Material 410 of coating 150 in general corresponds to polymeric material of the region 230 depicted in state (c) or (d) of FIG. 2. That is, material 410 can be a mixture of types 1 to 3 of HDCN 240 or mixtures of types 1 to 3 of PHT 250.

Figure 4B:
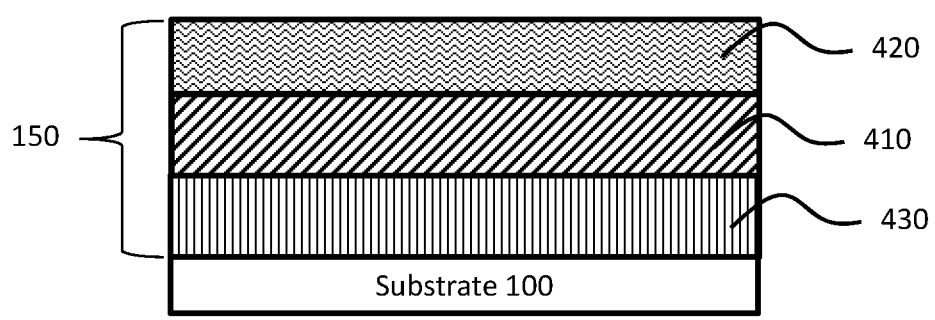
FIG. 4B depicts an inhomogeneous polymeric coating.

FIG. 4B depicts a polymeric coating formed on a substrate with a compositional gradient along the thickness direction. In FIG. 4B, coating 150 formed on substrate 100 corresponds in general to state (c) or state (d) depicted in FIG. 2. Material 430 of coating 150 is rich in polymeric material primarily derived from polymerization of highly soluble diamine monomers (e.g., HSDA 220) from the primer film 110. The HSDA component reacts with paraformaldehyde from precursor film 120. Material 430 is not necessarily exclusively derived from HSDA monomers, but the HSDA-derived polymer fraction in material 430 predominates over the ADA-derived polymer fraction in material 430. As was the case in the homogenous coating depicted in FIG. 4A, material 410 in FIG. 4B can be a mixture of types 1 to 3 of HDCN 240 or mixtures of types 1 to 3 of PHT 250. Material 420 of coating 150 is rich in polymeric material primarily derived from polymerization of aromatic diamine monomers (e.g., ADA 210) from a precursor film 120 with paraformaldehyde (also from precursor film 120). The material 420 is not necessarily exclusively derived from ADA monomers, but the ADA-derived polymer fraction in material 420 predominates over the HSDA-derived polymer fraction in material 420.

As noted in the discussion of FIG. 1, the film stack used to form coating 150 may include several primer films 110 and precursor films 120 stacked in an alternating manner. As such, a coating 150 having a compositional gradient as depicted in FIG. 4B can include several alternating portions of materials 420 and 430 with interposed portions of material 410. The relative thicknesses of these portions may be varied by control of the initial thicknesses of the primer films 110 and the precursor films 120 and other processing parameters like curing temperature and times, solvent loadings, and paraformaldehyde loadings. In some instances, the thickness of material 410 may be negligible when inter-film mixing of ADA and HSDA monomers is negligible. And as noted with respect to FIG. 4A, distinct phases corresponding to material 420 and material 430 may be absence from coating 150 when inter-film mixing of ADA and HSDA monomers is substantial.

Film Stacking and 3D Printing

Physical properties of coating 150 can be varied according to the selection of specific monomer components and their proportions. For example, PHT materials derived from ADA components, such as ODA, can have a high modulus and a high glass transition temperature. PHT materials derived from HSDA components can have a lower modulus and a lower glass transition temperature in comparison. Thus, a gradient coating including alternating material 430 and material 420 can have alternating layers of relatively flexible material and relatively stiff material. This sort of arrangement may be advantageous in coating applications requiring both durability and hardness. In addition, the alternating materials in a gradient coating 150 may be useful in optical coating applications.

FIG. 1 depicts as an optional process the repeated formation of primer films 110 and precursor films 120 in a multiple layer stack prior to curing into a coating 150. Another processing sequence achieving somewhat similar results would be to form a single primer film 110 and a single precursor film 120, cure this pair to form a first coating 150, then repeat the process by forming another primer film 110 and precursor film 120 on the previously formed first coating 150. The second pair of films can then be cured to form another coating 150 over the first coating 150. This, in effect, treats the first coating 150 as a part of substrate 100 and repeats the initial processing depicted in FIG. 1.

A related processing sequence would be to form at least one primer film and at least one precursor film 120 each over the entirety of substrate 100, then to selectively heat only portions of the films thus formed. Only the portions selected for heating would substantially cure, and uncured (or low cure) portions of the films could be removed with solvent(s). Selective heating could be provided, for example, by exposure to light or other radiation or by a thermal printing apparatus.

As previously noted, it is not required that either of primer film 110 or precursor film 120 completely cover the substrate 100 when formed. Rather either film can be selectively deposited onto the substrate 100. That is, one or both of these films can be selectively disposed on substrate 100 in an arbitrary pattern. For example, substrate 100 may be a metal plate or a silicon wafer having a substantially flat surface. In one process, primer film 110 could be coated over the entire surface of substrate 100, then precursor film 120 could be selectively deposited over primer film 110 in a desired pattern. The film stack thus formed could then be heated and cured. Those portions of primer film 110 beyond the diffusion distance of paraformaldehyde provided by the patterned precursor film 120 would not cure to polyhemiaminal or poly(hexahydrotriazine) material. The uncured portions of primer film 110 could be removed by solvent. The process could be repeated to build a patterned structure on substrate 100 in a layer-by-layer process. In another, process each of primer film 100 and precursor film 120 could be selectively deposited on the substrate 100 in a desired pattern, then the patterned stack could be cured. This process could also be repeated to build a patterned structure on substrate 100 in a layer-by-layer process.

Properties of Coating Materials

Various materials were prepared by curing a HSDA component with a particular ADA component (4,4'-oxydianiline (ODA)). The first column of Table 1 depicts the structure of the HSDA component. The second column is the percentage (wt %) of HSDA in the mixture with ODA (that is, the percentage of total combined weight of HSDA and ODA in the mixture). In preparing these materials, an excess of paraformaldehyde was used. HSDA and ODA were dissolved in NMP. The third column is the temperature at which the resulting materials lost 5% of initial mass as determined in a thermogravimetric analysis. The fourth column is the glass transition temperature ($T_g$) of the resultant material as determined by differential scanning calorimetry.

Incorporation of HSDA components in the resultant PHT network affects the thermal properties of the resultant material as the crosslinking density varies. While these materials can be prepared by simple mixing of components, in general, HSDA components react very quickly (gelation time of about 1 minute or less at 50° C.) in the presence of paraformaldehyde. Fast curing times may be desirable in some situations, but not always when requirements such as handling, storage, and processing windows are considered.

TABLE 1

Thermal properties of HSA-ODA PHT materials.

| HSDA | w % MM | $T_{5\%}$ [° C.] | $T_{g,DSC}$ [° C.] |
|---|---|---|---|
| [structure 1: H₂N–C₆H₄–CH₂–NH–C(O)–CH₂CH₂–O–(CH₂)₄–O–CH₂CH₂–C(O)–NH–CH₂–C₆H₄–NH₂] | 100 | 255 | 83 |
| | 69 | 254 | 81 |
| | 49 | 249 | 101 |
| | 20 | 247 | 139 |
| | 20 (film) | 255 | 188 |
| [structure 2: trimethylolpropane-based tri(amide) with three H₂N–C₆H₄–CH₂–NH–C(O)–CH₂CH₂–O– arms] | 100 | 262 | 71 |
| | 69 | 273 | 101 |
| | 49 | 271 | 115 |
| | 20 | 261 | 135 |
| | 20 (film) | 250 | 158 |

The gelation time of ODA/paraformaldehyde/NMP solutions is about 1-2 hours at 50° C. The gelation time of typical HSDA/paraformaldehyde/NMP solutions is about 1 minute at 50° C. Without paraformaldehyde, the HSDA component will be substantial stable and can be stored and/or processed. Higher viscosity HSDA components, such as those depicted in Table 1, can be prepared. Higher viscosity solutions may be preferred for some coating processes such as dip coating or spraying as it may allow for more stable coverage of substrate materials.

Example Dip-Coating Process and Coatings

A primer-type solution was prepared by mixing approximately 1 gram of 4-amino benzylamine, 0.75 gram trimethylolpropane triacrylate, and 1.7 gram of NMP. The mixture was stirred for 4 hours at 50° C. Substantially complete conversion of the acrylate was confirmed by $^1$H NMR.

A precursor-type solution was prepared by mixing approximately 2 grams of ODA, 1.1 grams of paraformaldehyde, and 15 mL of NMP. The solution was stirred until clear (about 15 minutes), then stored at 0° C. until use.

A substrate (e.g., a metal screen) was dipped into the primer-type solution previously prepared. The substrate was then dipped into the precursor-type solution previously prepared. These steps can be repeated to prepare a thicker film. After 10 to 30 seconds at elevated temperature (e.g., 50° C.) gelation of the material disposed on the substrate was observed (by visual inspection).

The coated substrate was then subjected to thermal processing: 50° C. for 1 hour, 50° C. to 200° C. for +1 hour, and 200° C. for 1 hour. The coating on the substrate thus formed was subjected to dynamic mechanical analysis (DMA).

Figure 5:
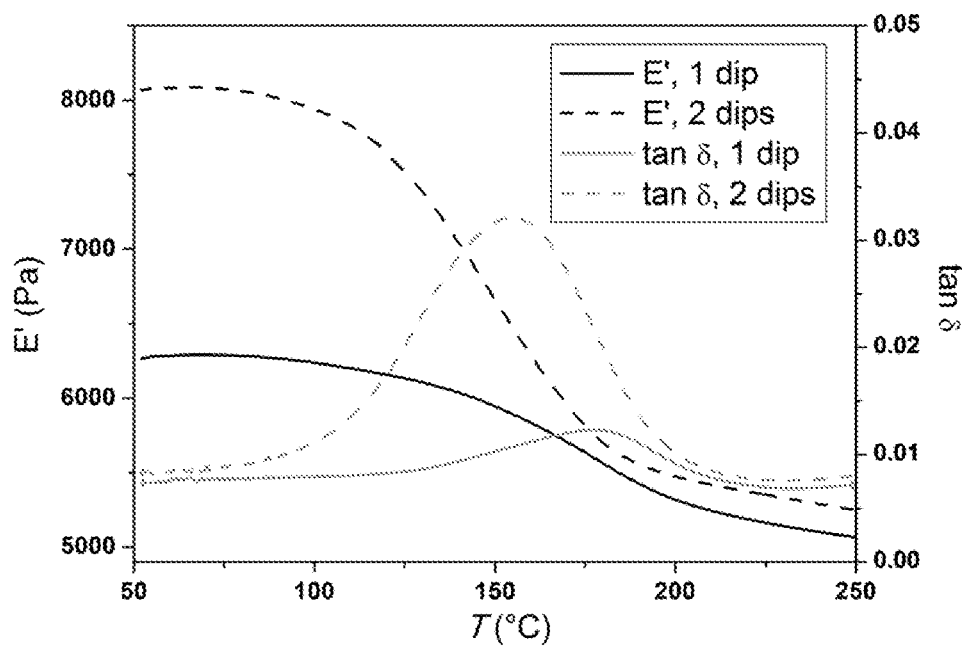
FIG. 5 depicts dynamic mechanical analysis results for example polymeric coatings prepared by a dip coating process.

FIG. 5 depicts DMA measurement results for a polymeric coating formed on a substrate (a metal screen in these examples). A temperature sweep (50° C. to 250° C.) DMA measurement for different samples is depicted. The storage modulus (E') is on the left-side axis and the tangent of the phase lag (δ) between stress and strain is on the right-side axis. A "1 dip" coating (consisting of a single dip in each of the primer-type solution and the precursor-type solution before thermal processing) is depicted by the solid lines. A "2 dips" coating (consisting of two sequential dips in each of the primer-type solution and the precursor-type solution before thermal processing) is depicted by dashed lines. FIG. 5 depicts a single glass transition temperature ($T_g$) for each coating type ("1 dip" and "2 dips") evidencing the formation of a homogenous coating in each instance.

Example Spray-Coating Process and Coatings

A primer-type solution was prepared by mixing approximately 1 g of 4-aminobenzylamine, 0.8 g 1,4-butanediol diacrylate, and 1.8 g NMP. The mixture was stirred at 50° C. for 4 hours. The conversion of acrylate was checked for completeness by $^1$H NMR and the solution was diluted with additional solvent before transfer to a storage reservoir of a first spraying apparatus.

A precursor-type solution was prepared by mixing approximately 2 g of ODA, 1.1 g paraformaldehyde, and 15 mL NMP. The solution was sealed and heated to 50° C. After approximately 15 min at 50° C., the sealed solution became clear and was then transferred a storage reservoir of a second spraying apparatus.

Figure 6:
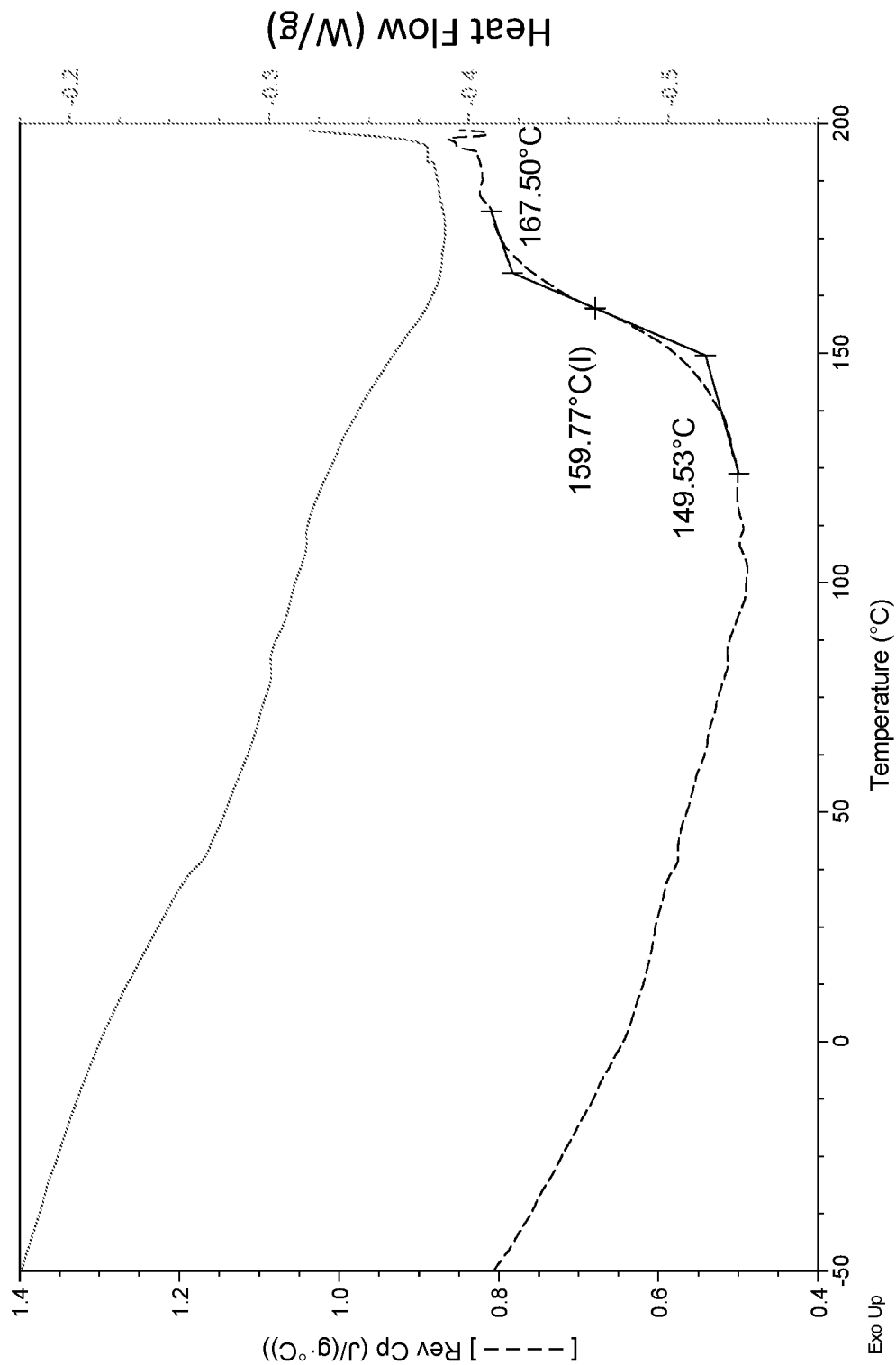
FIG. 6 depicts differential scanning calorimetry results for example polymeric coatings prepared by a spray coating process.

Layers were sprayed successively on to a glass substrate (distance between the substrate and spray apparatus nozzle being about 15 cm; spraying pressure approximately 25 psi). The layers were sprayed on the glass substrate in this order: 1) primer-type solution, then 2) precursor-type solution until a total of eight layers (4 of each type) were deposited on the substrate. After 30 seconds, the sprayed on solutions vitrified. The glass substrate was then transferred on a hot plate for curing. The following thermal treatment was used: 50° C. for 1 hour, 50° C. to 110° C. 1 hour, 110° C. for 1 hour, 110° C. to 200° C.+1 hour, 200° C. for 1 h after which the coated substrate was allowed to cool down to room temperature (25° C.). A piece of the resultant film was scrapped for the surface of the substrate with a blade then this piece was subjected to thermal analysis. FIG. 6 depicts differential scanning calorimetry (DSC) analysis of the material formed by this method. FIG. 6 shows that by DSC the polymeric material formed in the manner described above had glass transition temperature ($T_g$) of approximately 160° C.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A polymeric coating formed by a method comprising:
depositing a first layer on a substrate, the first layer comprising at least one of the following compounds:

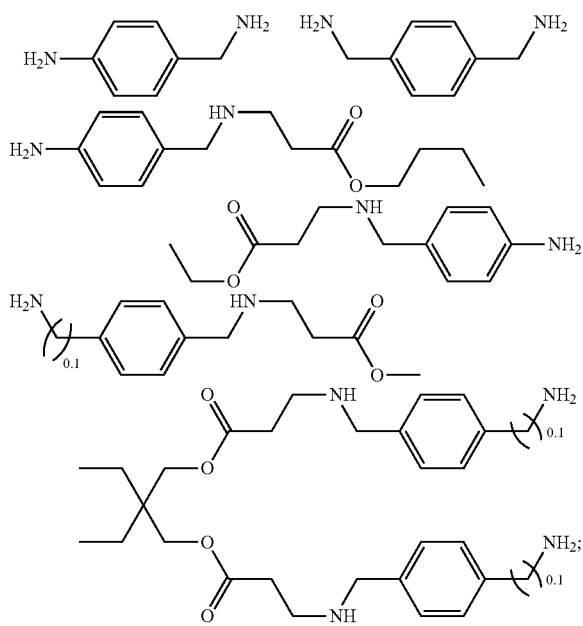

depositing a second layer on the substrate, the first and second layers contacting each other, the second layer comprising paraformaldehyde and an aromatic diamine including two primary amine groups; and
heating the first and second layers to form a polymeric coating.

2. The polymeric coating according to claim 1, wherein the polymeric coating is homogenous along a thickness direction normal to the substrate.

3. The polymeric coating according to claim 1, wherein the polymeric coating includes distinct compositional regions along a thickness direction normal to the substrate.

4. The polymeric coating according to claim 1, wherein the second layer covers only a portion of the first layer.

5. The polymeric coating according to claim 1, wherein the first and second layers are heated to a temperature between 50° C. and 200° C.

6. The polymeric coating according to claim 1, wherein the first layer includes:

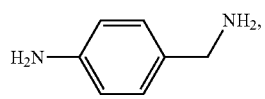

and
the aromatic diamine of the second layer is 4,4'-oxydianiline (ODA).

7. The polymeric coating according to claim 1, wherein heating the first and second layers forms polyhexahydrotriazine.

8. The polymeric coating according to claim 1, wherein heating the first and second layers forms hemiaminal dynamic covalent network.

9. A polymeric coating on a substrate, comprising:
a first polymeric material formed by reaction of paraformaldehyde with at least one of the following compounds:

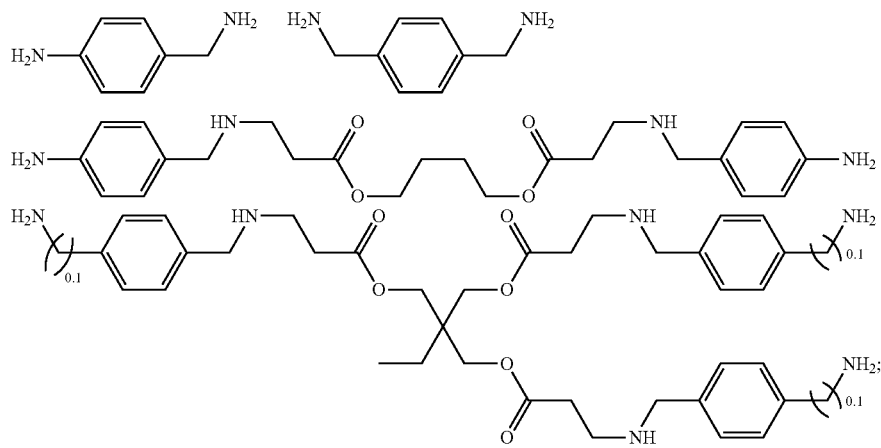

and
a second polymeric material formed by reaction of paraformaldehyde with at least one aromatic diamine selected from the group consisting of 4,4'-oxydianiline, 4,4'-methylenedianiline, 4,4'-(9-fluorenylidene)dianiline, p-phenylenediamine, 1,5-diaminonaphthalene, 1,4-diaminonaphthalene, benzidine, 4,4'-thiodianiline, and N1-(4-aminophenyl)-N1-phenylbenzene-1,4-diamine.

10. The polymeric coating of claim 9, wherein the first polymeric material is a polyhexahydrotriazine.

11. The polymeric coating of claim 10, wherein the second polymeric material is a polyhexahydrotriazine.

12. The polymeric coating of claim 9, wherein the second polymeric material is a polyhexahydrotriazine.

13. The polymeric coating of claim 9, further comprising:
a third polymeric material formed by reaction of paraformaldehyde with the at least one compound of the first polymeric material and the aromatic diamine of the second polymeric material.

14. The polymeric coating of claim 9, wherein the first polymeric material is a layer adjacent to the substrate.

15. The polymeric coating of claim 9, wherein the first polymeric material and the second polymeric material are intermixed.

16. The polymeric coating of claim 9, wherein the first polymeric material is in a first layer and the second polymeric material is in a second layer adjacent to the first layer.

17. The polymeric coating of claim 9, further comprising:
a plurality of alternating layers of first polymeric material and second polymeric material.

18. The polymeric coating of claim 9, further comprising:
a third polymeric material formed by reaction of paraformaldehyde with the at least one compound of the first polymeric material and the aromatic diamine of the second polymeric material, wherein the third polymeric material is in region between a first layer region is predominately first polymeric material and a second region that is predominately second polymeric material in a direction normal to the substrate.

* * * * *